United States Patent
Yamada

(10) Patent No.: US 7,093,901 B2
(45) Date of Patent: Aug. 22, 2006

(54) SEAT FRAME OF A VEHICLE SEAT

(75) Inventor: Yukifumi Yamada, Toyota (JP)

(73) Assignee: Aisin Seiki Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 10/216,868

(22) Filed: Aug. 13, 2002

(65) Prior Publication Data

US 2003/0062754 A1 Apr. 3, 2003

(30) Foreign Application Priority Data

Aug. 27, 2001 (JP) .................................. 2001-256215

(51) Int. Cl.
*B60N 2/02* (2006.01)

(52) U.S. Cl. ................ 297/367; 297/354.12; 297/452.2

(58) Field of Classification Search ................. 297/367, 297/362, 354.12, 452.18, 452.2
See application file for complete search history.

(56) References Cited

U.S. PATENT DOCUMENTS

| | | | |
|---|---|---|---|
| 4,713,986 A | 12/1987 | Cremer et al. | |
| 5,050,932 A | 9/1991 | Pipon et al. | |
| 5,785,386 A * | 7/1998 | Yoshida | 297/367 |
| 5,788,331 A | 8/1998 | Aufrere et al. | |
| 5,816,656 A * | 10/1998 | Hoshihara et al. | 297/367 |
| 5,826,944 A * | 10/1998 | Beneker et al. | 297/440.2 |
| 5,988,756 A | 11/1999 | Aufrere et al. | |
| 6,010,191 A * | 1/2000 | Calinaud et al. | 297/367 |
| 6,048,033 A | 4/2000 | Sakurai et al. | |
| 6,375,267 B1 | 4/2002 | Ishikawa | |
| 6,505,889 B1 * | 1/2003 | Frolo et al. | 397/354.12 |
| 6,543,855 B1 * | 4/2003 | Bruck | 297/440.21 |
| 2003/0011230 A1 * | 1/2003 | Haglund | 297/367 |

FOREIGN PATENT DOCUMENTS

| | | |
|---|---|---|
| DE | 31 52 010 A1 | 7/1983 |
| DE | 35 29 887 A1 | 3/1987 |
| DE | 0 283 361 B1 | 9/1988 |
| DE | 42 09 391 A1 | 1/1992 |
| DE | 100 41 655 | 3/2002 |
| EP | 0 709 250 | 1/1996 |
| FR | 2 801 545 | 6/2001 |
| GB | 2 112 851 | 7/1983 |
| JP | 149175 | 6/2001 |
| JP | 2001-149175 | 6/2001 |

* cited by examiner

*Primary Examiner*—Laurie K. Cranmer
(74) *Attorney, Agent, or Firm*—Finnegan, Henderson, Farabow, Garrett & Dunner, LLP

(57) ABSTRACT

A seat frame of a vehicle seat includes a seat cushion frame on a seat cushion side, a seat back frame on a backrest side, and a reclining device provided between the seat back frame and the seat cushion frame for adjusting an angle of incline of the seat back frame relative to the seat cushion frame. Either one of the seat back frame or the seat cushion frame includes a first member having a first fitting plane portion to the reclining device and a second member connected to the first member by holding a first space therebetween, and a hollow portion connected to the first space provided on an outer periphery of the first fitting plane portion.

7 Claims, 4 Drawing Sheets

SEAT FRAME OF A VEHICLE SEAT

This application is based on and claims priority under 35 U.S.C. § 119 with respect to Japanese Application No. 2001-256215 filed on Aug. 27, 2001, the entire content of which is incorporated herein by reference.

FIELD OF THE INVENTION

This invention generally relates to a seat frame of a vehicle seat. More particularly, the present invention pertains to a seat frame of a vehicle seat wherein a seat back frame and a seat cushion frame are connected through a reclining device and which can improve a torsional strength and a bending strength of the seat frame.

BACKGROUND OF THE INVENTION

Known seat frame which can improve a torsional strength and a bending strength is disclosed in a Japanese Patent Laid-Open Publication No. 2001-149175. In the disclosed seat frame, a seat back frame is configured by a pipe forming product and a side bracket is fixed to a side of the seat back frame where a reclining device is provided. The side bracket is formed from steel sheet and a peripheral portion of the side bracket is bent at a right angle so as to form a rib. In addition, a sectional surface of the side bracket has a horseshoe shape. Then, a reinforcing bracket having also a rib and a horseshoe sectional surface is secured between the side bracket and a lower edge of the seat back frame for improving a torsional strength and a bending strength of the side bracket.

According to a seat structure in which a seat belt is mounted to the seat back frame, the seat frame receives an excessive load in case of a vehicle collision. Thus, in the seat frame disclosed in the publication and configured in an aforementioned manner, the strengths of the side bracket and the reinforcing bracket are required to be improved. In order to meet this requirement, however, the sizes of the side bracket and the reinforcing bracket having the horseshoe sectional surface or plate materials thereof need to be larger or thicker.

SUMMARY OF THE INVENTION

It is an object of the present invention to provide a seat frame of a vehicle seat which can improve a torsional strength and a bending strength thereof. It is another object of the present invention to provide a seat frame of a vehicle seat which can obviate the above conventional drawbacks.

According to a first aspect of the present invention, the seat frame includes a seat cushion frame on a seat cushion side, a seat back frame on a backrest side, and a reclining device provided between the seat back frame and the seat cushion frame for adjusting an angle of incline of the seat back frame relative to the seat cushion frame. Either one of the seat back frame or the seat cushion frame includes a first member having a first fitting plane portion to the reclining device, a second member connected to the first member by holding a first space therebetween, and a hollow portion provided on an outer periphery of the first fitting plane portion and continuing into the first space.

According to a second aspect of the present invention, the other one of the seat cushion frame or the seat back frame includes a third member having a second fitting plane portion to the reclining device, a fourth member connected to the third member by holding a second space therebetween, a first rib portion formed at a peripheral portion of the second fitting plane portion of the third member and a second rib portion formed at the fourth member for surrounding the reclining device.

According to a third aspect of the present invention, the seat frame is provided with one or both of a first connecting member extending through the first space and being connected to the first member and the second member, and a second connecting member extending through the second space and being connected to the third member and the fourth member.

According to a fourth aspect of the present invention, either one of the first connecting member or the second connecting member connected to the seat back frame is projected to a side face of the seat back frame for forming a spring hook portion.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements and wherein.

DETAILED DESCRIPTION OF THE INVENTION

An embodiment of the present invention will be explained referring to drawings.

Figure 1:
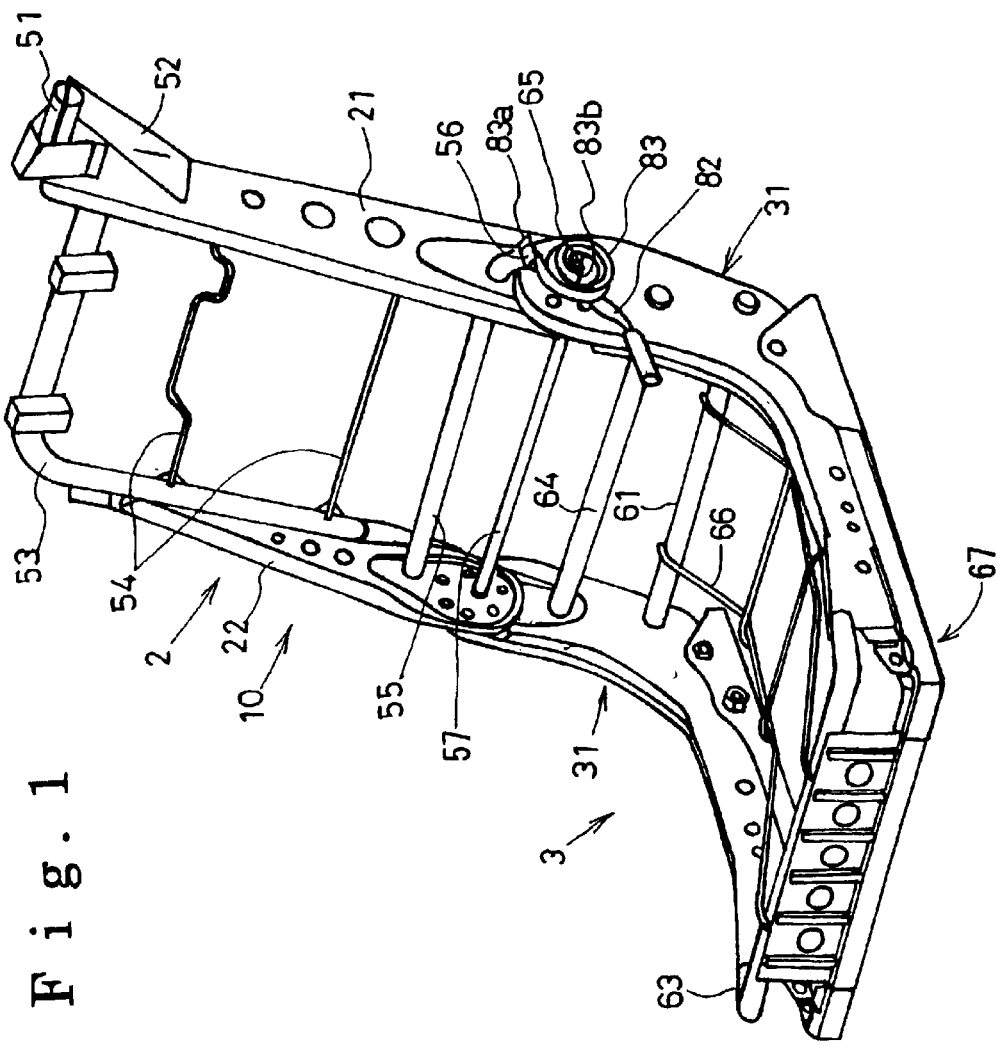
FIG. 1 is a perspective view of a seat frame according to an embodiment of the present invention.
Figure 2:
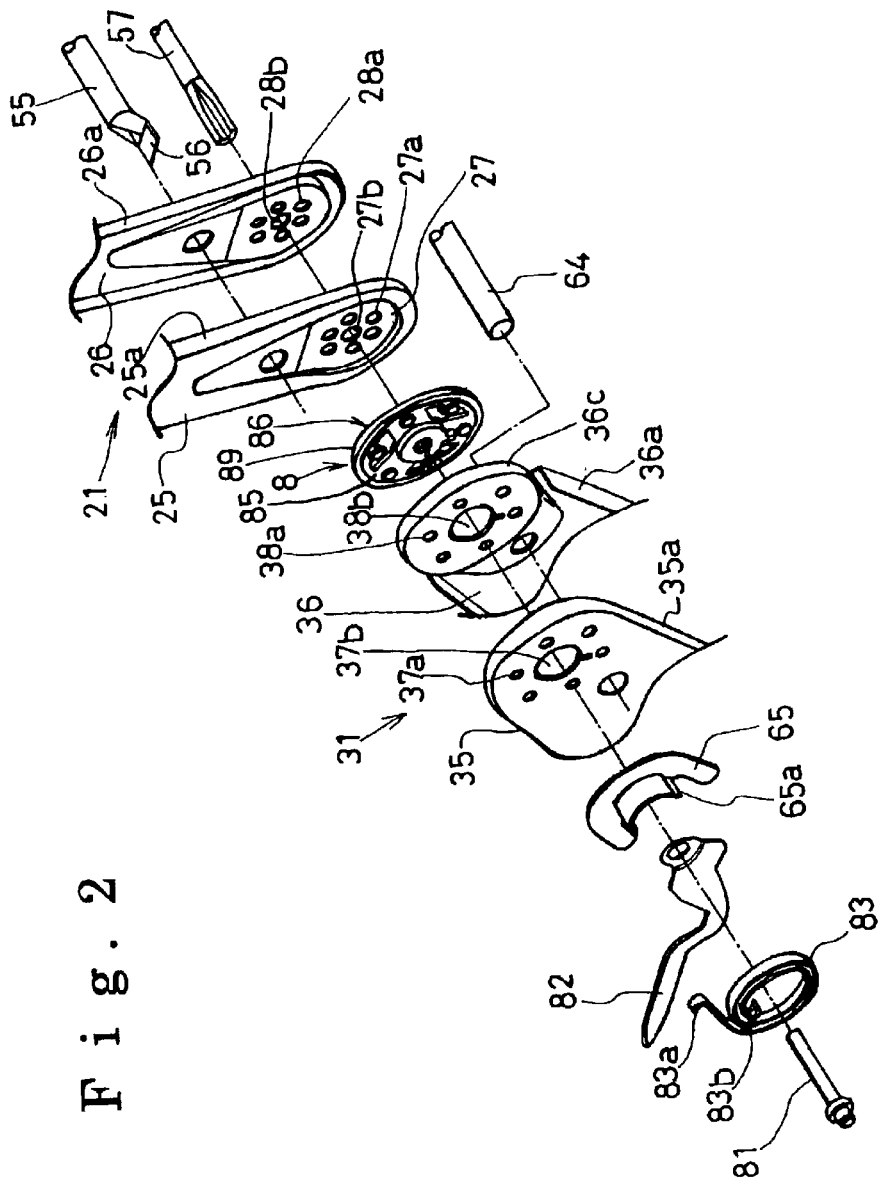
FIG. 2 is an exploded perspective view of a portion of the seat frame according to the embodiment of the present invention.

As shown in FIG. 1, a seat frame 10 of a vehicle seat includes a seat back flame 2 on a backrest side and a seat cushion frame 3 on a seat cushion side. Further, as shown in FIG. 2, a reclining device 8 is disposed between the seat back frame 2 and the seat cushion frame 3 for supporting the seat back frame 2 so as to adjust an inclination angle of the seat back frame 2 relative to the seat cushion frame 3. The reclining device 8 is a known type that has a circular outer shape and includes a lock mechanism (not shown). In the reclining device 8, the lock mechanism is released by a shaft 81 integrally secured to a lever 82 and rotated by an operation of the lever 82. When the lock mechanism is released, the seat back frame 2 can be rotated around a center of the reclining device 8 so that the inclination angle of the seat back frame 2 relative to the seat cushion frame 3 can be adjusted. After the angle is adjusted, the lock mechanism is locked again by releasing the lever 82 and then the adjusted angle position is maintained.

As shown in FIG. 1, a reverse U-shaped pipe frame portion 53 is fixed at an upper portion of the seat back frame 2. A right side bracket portion 22 and a left side bracket portion 21 are welded to each side of the pipe frame portion 53 in such a manner as to extend downwardly.

Figure 4:
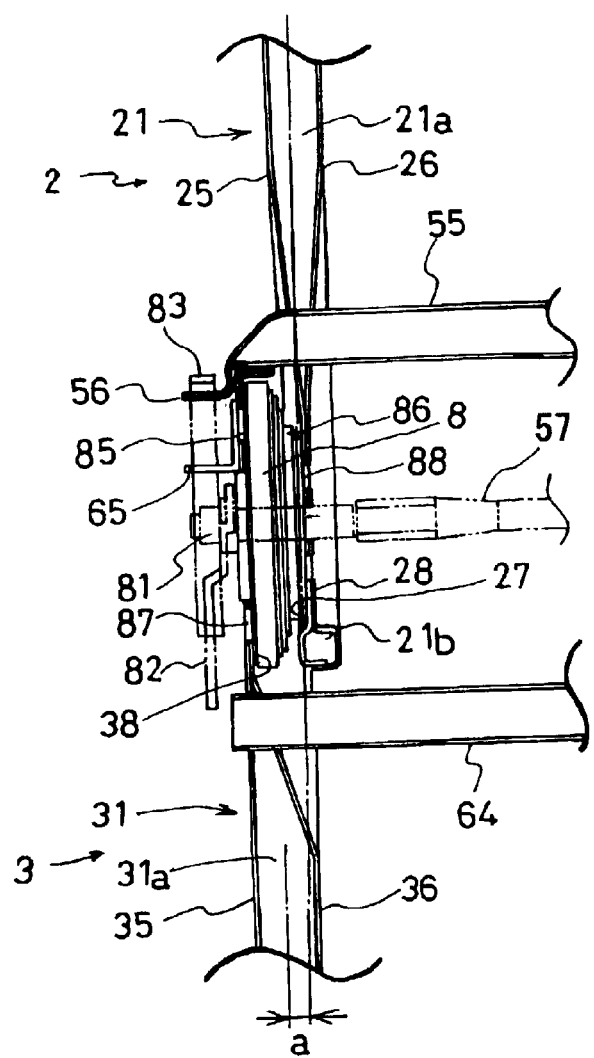
FIG. 4 is a cross sectional view taken along the line B—B of FIG. 3.

At an upper end portion of the left side bracket portion 21, a holder portion 51 to which one end of the seat belt (not shown) is mounted and a bracket 52 for reinforcing mounting of the holder portion 51 are provided. Further, as shown in FIGS. 2, 4, the left side bracket portion 21 includes an outer bracket 25 and an inner bracket 26. Each peripheral portion of the outer bracket 25 and the inner bracket 26 is bent at a right angle to form flanges 25a and 26a respectively. The outer bracket 25, the inner bracket 26, and the flanges 25a, 26a are overlapped and connected each other to form a space 21a. At a lower end portion of the left side bracket portion 21, a fitting plane portion 27 to the reclining device 8 is formed at the outer bracket 25. Also a flat portion in a concave portion 28 is formed at the inner bracket 26. Further, around the lower end portion of the left side bracket portion 21, a hollow portion 21b continuing into the space 21a is formed in such a manner as to surround the fitting plane portion 27 and the concave portion 28. The fitting plane portion 27 and the concave portion 28 are in contact each other by back faces thereof. As shown in FIG. 2, holes 27b, 28b through which the shaft 81 is extended are formed at each flat portion in the fitting plane portion 27 and the concave portion 28. In addition, multiple holes 27a, 28a are arranged on each circle being concentric with each hole 27b, 28b. The multiple holes 27a, 28a are matched each other under the condition that the outer bracket 25 and the inner bracket 26 are connected each other.

At the right side bracket portion 22, the holder portion for mounting the seat belt is not provided. However, the rest structure is substantially same as that of the left side bracket portion 21 so that an explanation of the right side bracket portion 22 is not repeated here. Since the holder portion for mounting the seat belt is not provided at the right side bracket portion 22, the right side bracket portion 22 does not receive the load directly from the seat belt at a vehicle collision. Thus, the right side bracket portion 22 is configured smaller than the left side bracket portion 21. The right side bracket portion 22 and the left side bracket portion 21 of the seat back frame 2 are interconnected through a connecting pipe 55 extending horizontally at an upper position of the multiple holes 27a, 28a. As shown in FIG. 4, the connecting pipe 55 extends through the space 21a and is welded to both the outer bracket 25 and the inner bracket 26. Accordingly, when the excessive torsion or bending load affects the seat back frame 2, the connecting pipe 55 functions so as to maintain the shape of the space 21a for ensuring the high strength of the seat back frame 2.

The structure of the seat cushion frame 3 will be explained as follows. As shown in FIGS. 1, 2, 4, each side of the seat cushion frame 3 is provided with a frame portion 31. Each frame portion 31 includes an outer frame 35 and an inner frame 36. Each peripheral portion of the outer frame 35 and the inner frame 36 is bent at a right angle to form flanges 35a, 36a respectively. The outer frame 35, the inner frame 36, and the flanges 35a, 36a are overlapped and connected each other to form a space 31a. In the same way as the seat back frame 2, a connecting pipe 64 extends through the space 31a and is welded to both the outer frame 35 and the inner frame 36. At the upper end portion of the frame portion 31, a back face of a fitting plane portion 38 provided at the inner frame 36 for being fixed to the reclining device 8 is in contact with a flat portion of the outer frame 35. At peripheral portion of the fitting plane portion 38, a rib 36c is formed in such a manner as to surround the outer periphery of the reclining device 8. The rib 36c and a part of the flange 35a surrounding the outer periphery of the reclining device 8 can be supported by the outer periphery of the reclining device 8 so as not to be fallen down and to maintain the strength of the frame portion 31. The outer frame 35 and the inner frame 36 include holes 37b, 38b respectively being concentric with a rotation center of the reclining device 8 and multiple holes 37a, 38a provided on a circle being concentric with a center of the holes 37b, 38b respectively. The multiple holes 37a, 38a are matched each other under the condition that the outer frame 35 and the inner frame 36 are connected each other. Further, a bracket 65 having an inner hook portion 65a that covers a part of the outer periphery of the hole 37b and horizontally stands up in outward direction is secured to the outer frame 35.

According to the above structure, the seat cushion frame 3 includes the outer frame 35, the inner frame 36 connected each other by holding the space 31a therebetween, the rib 36c formed at the inner frame 36, and the flange 35a formed at the outer frame 35. Then, the seat cushion frame 3 can provide corresponding strength with that of the seat back frame 2 for improving the torsional and bending strengths of the seat frame.

Figure 3:
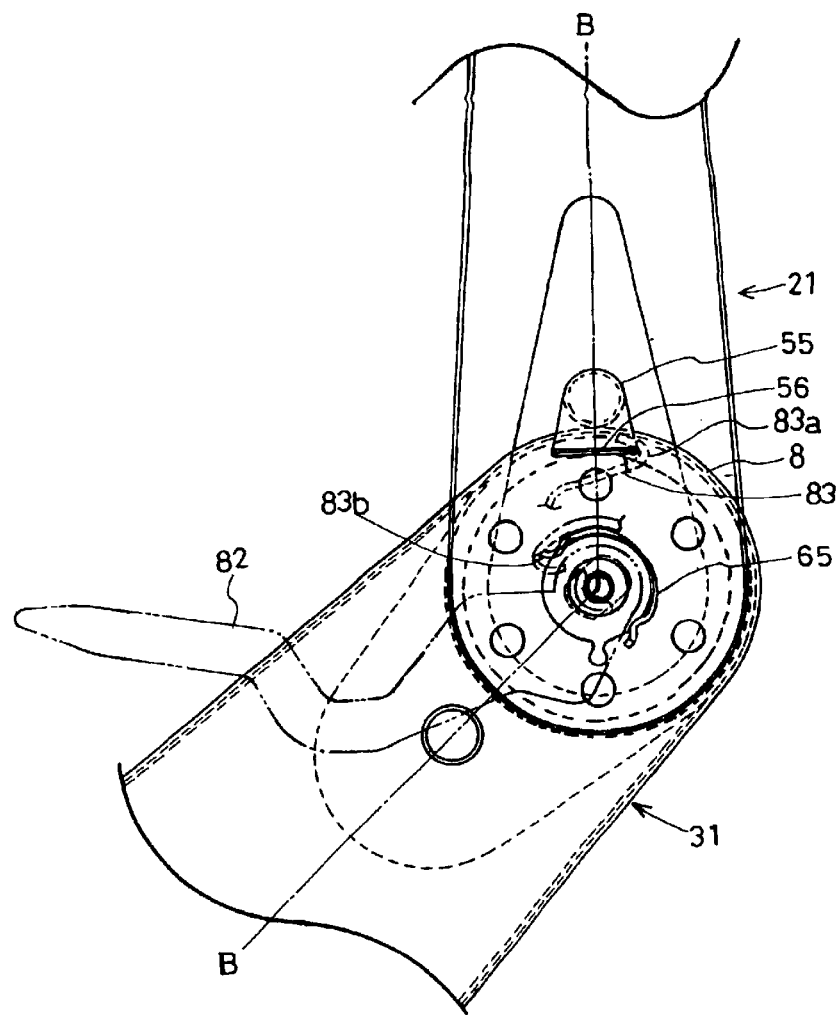
FIG. 3 is a side view of a portion of the seat frame according to the embodiment of the present invention.

As shown in FIG. 4, the reclining device 8 includes an upper member 86 secured to a side of the seat back frame 2, and a lower member 85 secured to a side of the seat cushion frame 3 and being rotatable to the upper member 86. Multiple projecting portions 88 formed at the upper member 86 are inserted into the multiple holes 27a, 28a formed at the left side bracket portion 21 and the right side bracket portion 22 of the seat back frame 2 for being secured each other by welding. In the same way, multiple projecting portions 87 formed at the lower member 85 are inserted into the multiple holes 37a, 38a formed at the frame portion 31 for being secured each other by welding. A ring member 89 is provided on the outer periphery of the lower member 85 so as to rotatably hold the upper member 86 on the lower member 85. The reclining devices 8 including the lock mechanism are provided on left and right sides of the seat frame 10 respectively. The shafts 81 provided on both sides of the seat frame 10 are interconnected by a connecting shaft 57 for simultaneous operation of both lock mechanisms of the reclining devices 8. By rotating either one of the levers 82 in the clockwise direction of FIG. 3, for example, the lock mechanisms on both sides are released at the same time.

As shown in FIG. 4, a side edge portion of the outer bracket 25 is positioned outer than the fitting plane portion 27 for the upper member 86. It means that the side edge portion of the outer bracket 25 is projected toward the inner frame 36 side. At the same time, a side surface of the inner frame 36 is positioned inner than the fitting plane portion 38 for the lower member. It means that the side surface of the inner frame 36 is formed to approach to the outer bracket 25 side. Thus, an offset "a" (shown in FIG. 4) provided between a center of the space 21a and a center of the space 31a are set to be minimized. Accordingly, the portion at which the seat back frame 2 and the seat cushion frame 3 are interconnected through the reclining device 8 receives the minimum torsional load caused by the excessive load that affects on the seat back frame 2.

As shown in FIGS. 1–4, the connecting pipe 55 is extended through the outer bracket 25 and the inner bracket 26, and then projected from the side face of the seat back frame 2. Each end portion of the connecting pipe 55 is processed to be flattened for forming an outer hook portion 56 having a flat shape. The bracket 65 having the inner hook portion 65a which partially surrounds the shaft 81 is secured to the outer frame 35 of the seat cushion frame 3. A spiral spring 83 is assembled to the outer hook portion 56 and the inner hook portion 65a by being supported by an outer end portion 83a and an inner end portion 83b. When the lock mechanism of the reclining device 8 is released, the seat back frame 2 is rotated forward (counterclockwise direction of FIG. 3) relative to the seat cushion frame 3 by the biasing force of the spiral spring 83.

According to the above structure, the connecting pipe 55 also functions as a hook portion for the spring so that the number of parts can be reduced.

The seat cushion frame 3 is formed with pipe frame portions 61, 63 connecting the right and left frame portions 31 and a base portion 67 connected to a floor of the vehicle (not shown) or a seat sliding device (not shown) for assuring the strength of the seat cushion frame 3. As shown in FIG. 1, cushion springs 54, 66 are provided at the seat back frame 2 and the seat cushion frame 3 respectively for elastically supporting an occupant weight.

On the seat frame 10 configured in an aforementioned manner, known cushion materials (not shown) and surface sheet materials (not shown) are provided for composing a seat.

When the seat back frame 2 receives the excessive load from the seat belt (not shown), the strength of the seat back frame 2 and the seat cushion frame 3 should correspond each other so that the deformation caused by the excessive load occurs evenly in the seat back frame 2 and the seat cushion frame 3. In case of a frontal collision of the vehicle, the excessive load in frontward direction is transmitted to the left upper end of the seat back frame 2 from the seat belt. Due to this load, the large bending and the torsional moment occur at the low end of the seat back frame 2, i.e., at the portion supported by the reclining device 8. In a case of the prior art structure, as mentioned above, the plate member has the horseshoe-shaped section and the rib on the periphery thereof, and the rib is easily bent in an early stage of the frame deformation. Once the rib is deformed by bending, the rigidity of the frame is remarkably decreased and thus the strength thereof cannot be assured sufficiently. If thickness of the member is increased for preventing the rib from being bent in order to counter against the excessive bending and the torsional moment, a weight increase of the member is not inevitable. According to the present invention, the space 21a is formed by the outer bracket 25 and the inner bracket 26 and represents the same effect that obtained when each right and left side bracket portion is formed with a thick member. In addition, the hollow portion 21b surrounding the fitting plane portion 27 for the reclining device 8 is provided at the lower portion of each right and left side bracket portion 21. The hollow portion 21b represents the same effect as the thicker rib and thus the bending deformation is not likely to occur. The torsional strength and the bending strength are remarkably increased. As mentioned above, since the deformation of the seat back frame 2 is restrained and the offset a (shown in FIG. 4) is adapted to be minimized, the deformation of the seat cushion frame 3 sequentially caused by that of the seat back frame 2 can be restrained and the strength thereof can be improved.

The above seat back frame 2 and the seat cushion frame 3 can be inversely configured. That is, the hollow portion 21b can be provided at the seat cushion frame 3 and the rib 36c can be provided at the seat back frame 2.

According to the present invention, the torsional strength and the bending strength can be improved without increasing a weight of the member of the seat frame.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

What is claimed is:

1. A seat frame of a vehicle seat comprising:
    a seat cushion frame on a seat cushion side;
    a seat back frame on a backrest side; and
    a reclining device provided between the seat back frame and the seat cushion frame proximate to one side of the vehicle seat for adjusting an inclination angle of the seat back frame relative to the seat cushion frame, wherein either one of the seat back frame or the seat cushion frame proximate to the one side of the vehicle seat includes a first member having a first fitting plane portion for the reclining device, a second member being connected to the first member so that the first member is located between the reclining device and the second member defining a first space between the first member and the second member, a hollow portion being defined between the first member and the second member provided on an outer periphery of the first fitting plane portion and continuing into the first space;
    wherein the other one of the seat cushion frame or the seat back frame proximate to the one side of the vehicle seat includes a third member having a second fitting plane portion for the reclining device, a fourth member connected to the third member by holding a second space therebetween, a first rib portion formed at a peripheral portion of the second fitting plane portion of the third member and a second rib portion formed at the fourth member for surrounding the reclining device;
    wherein the seat back frame includes the first member and the second member, and the seat cushion frame includes the third member and the fourth member; and
    further comprising a first connecting member extending through the first space and being connected to the first member and the second member.

2. A seat frame of a vehicle seat according to claim 1, further comprising:
    a second connecting member extending through the second space and being connected to the third member and the fourth member.

3. A seat frame of a vehicle seat according to claim 1, wherein the first connecting member connected to the seat back frame is projected to a side face of the seat back frame for forming a spring hook portion.

4. A seat frane of a vehicle seat comprising:
    a seat cushion frame on a seat cushion side;
    a seat back frame on a backrest side; and
    a reclining device provided between the seat back frame and the seat cushion frame proximate to one side of the vehicle seat for adjusting an inclination angle of the seat back frame relative to the seat cushion frame, wherein either one of the seat back frame or the seat cushion frame proximate to the one side of the vehicle seat includes a first member having a first fitting plane portion for the reclining device, a second member being connected to the first member so that the first member is located between the reclining device and the second member defining a first space between the first member and the second member, a hollow portion being dfined between the first member and the second member provided on an outer periphery of the first fitting plane portion and continuing into the first space;

wherein the other one of the seat cushion frame or the seat back frame proximate to the one side of the vehicle seat includes a third member having second fitting plane portion for the reclining device, a fourth member connected to the third member by holding a second space therebetween, a first rib portion formed at a peripheral portion of the second fitting plane portion of the third member and a second rib portion formed at the fourth member for surrounding the reclining device;

wherein the seat cushion frame includes the first member and the second member, and the seat back frame includes the third member and the fourth member; and further comprising a first connecting member extending through the first space and being connected to the first member and the second member.

5. A seat frame of a vehicle seat according to claim 4, further comprising:

a second connecting member extending through the second space and being connected to the third member and the fourth member.

6. A seat frame of a vehicle seat according to claim 5, wherein:

the second connecting member connected to the seat back frame is projected to a side face of the seat back frame for forming a spring hook portion.

7. A seat frame of a vehicle seat according to claim 4, wherein the seat cushion frame includes the first member and the second member.

* * * * *